United States Patent
Ye et al.

(10) Patent No.: US 10,190,705 B2
(45) Date of Patent: Jan. 29, 2019

(54) THERMOSETTING BAMBOO-WOOD COMPOSITE PIPE

(71) Applicants: Zhejiang Xinzhou Bamboo-based Composites Technology Co., Ltd., Hangzhou (CN); Ling Ye, Huzhou (CN)

(72) Inventors: Ling Ye, Huzhou (CN); Xin Zhu, Huzhou (CN); Huiqing Yang, Huzhou (CN); Linying Zhou, Huzhou (CN); Shulin Shen, Huzhou (CN)

(73) Assignees: ZHEJIANG XINZHOU BAMBOO-BASED COMPOSITES TECHNOLOGY CO., LTD., Hangzhou (CN); Ling Ye, Huzhou (CN)

( * ) Notice: Subject to any disclaimer, the term of this patent is extended or adjusted under 35 U.S.C. 154(b) by 15 days.

(21) Appl. No.: 15/646,032

(22) Filed: Jul. 10, 2017

(65) Prior Publication Data

US 2017/0307110 A1    Oct. 26, 2017

Related U.S. Application Data

(63) Continuation-in-part of application No. PCT/CN2015/092335, filed on Oct. 20, 2015.

(30) Foreign Application Priority Data

Jan. 9, 2015    (CN) .................. 2015 2 00142219 U

(51) Int. Cl.
    *F16L 9/14*    (2006.01)
    *F16L 9/16*    (2006.01)

(52) U.S. Cl.
    CPC .. *F16L 9/16* (2013.01); *F16L 9/14* (2013.01)

(58) Field of Classification Search
    CPC ...... F16L 9/14; F16L 9/16; B32B 1/08; B32B 9/02; B32B 9/04; B32B 2262/065; B32B 2597/00
    USPC ............... 138/144, 141, 137, 140; 428/36.91
    See application file for complete search history.

(56) References Cited

U.S. PATENT DOCUMENTS

| | | | | |
|---|---|---|---|---|
| 2,540,482 | A | * | 2/1951 | Hervey ..................... B64C 1/00 138/141 |
| 3,956,542 | A | * | 5/1976 | Roberti ..................... B27D 1/08 428/35.6 |
| 3,959,541 | A | * | 5/1976 | King ..................... F16L 59/029 428/428 |

(Continued)

FOREIGN PATENT DOCUMENTS

| CN | 104806871 A | * | 7/2015 |
|---|---|---|---|
| CN | 205350604 U | * | 6/2016 |
| CN | 205716073 U | * | 11/2016 |

*Primary Examiner* — Patrick F Brinson
(74) *Attorney, Agent, or Firm* — Matthias Scholl P.C.; Matthias Scholl

(57) ABSTRACT

A composite pipe including an inner liner layer, a reinforcement layer, a structural layer, and an outer protection layer. The inner liner layer, the reinforcement layer, the structural layer, and the outer protection layer are arranged in that order from the inside out along the radial direction of the pipe. The reinforcement layer includes wound bamboo strips; the structural layer includes a wound planed board; and the reinforcement layer and the structural layer are sandwiched between the inner liner layer and the outer protection layer.

13 Claims, 1 Drawing Sheet

(56) References Cited

U.S. PATENT DOCUMENTS

| | | | |
|---|---|---|---|
| 4,025,675 A * | 5/1977 | Jonda | E04C 2/36 |
| | | | 428/36.2 |
| 5,576,082 A * | 11/1996 | Jarrett | B27D 1/086 |
| | | | 428/36.91 |
| 9,903,513 B2 * | 2/2018 | Zhu | F16L 9/14 |
| 2016/0245429 A1 * | 8/2016 | Zhu | F16L 9/14 |

* cited by examiner

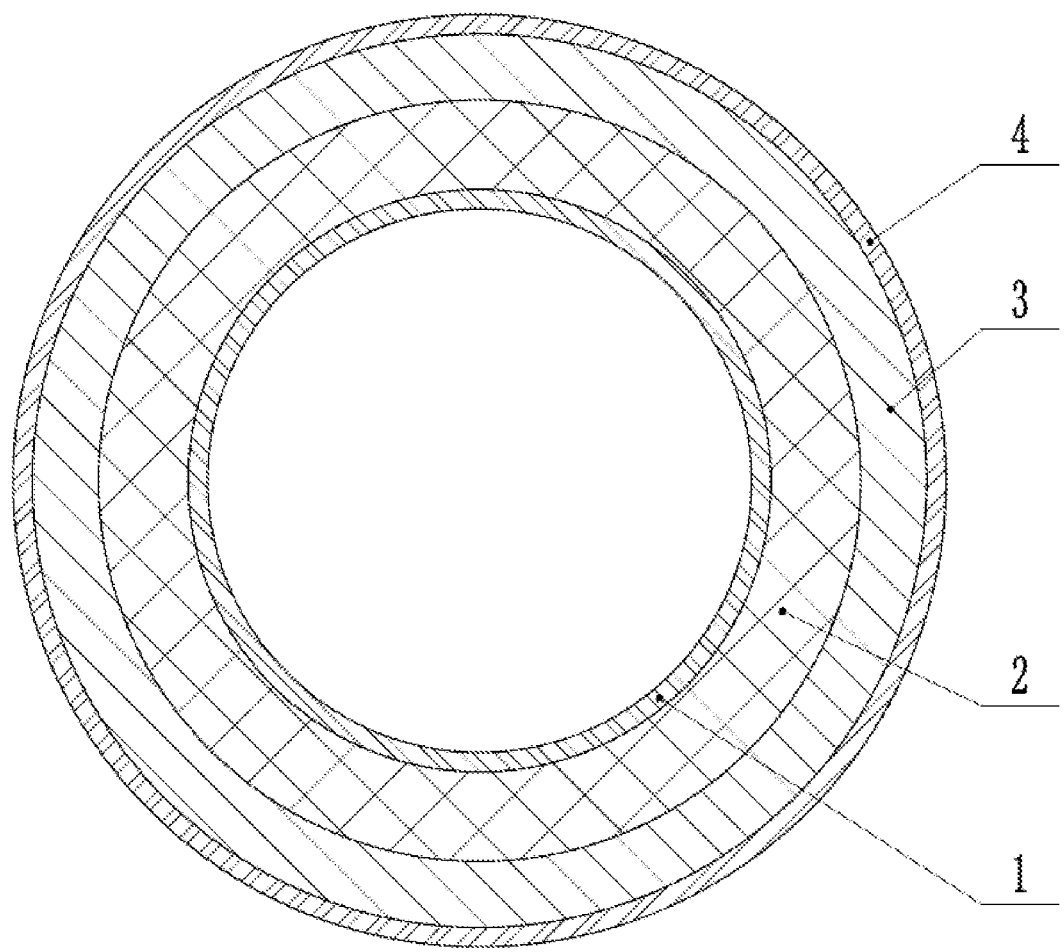

THERMOSETTING BAMBOO-WOOD COMPOSITE PIPE

CROSS-REFERENCE TO RELATED APPLICATIONS

This application is a continuation-in-part of International Patent Application No. PCT/CN2015/092335 with an international filing date of Oct. 20, 2015, designating the United States, now pending, and further claims foreign priority benefits to Chinese Patent Application No. 201520014219.7 filed Jan. 9, 2015. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a composite pipe.

Description of the Related Art

Currently, cement pipes, organic plastics pipes, glass reinforced plastics pipes, and thin-wall iron pipes are widely used for agricultural irrigation, water drainage, and building ventilation. Cement pipes are low in strength and are dense. Organic plastics pipes are insufficient in rigidity and strength. The production of glass reinforced plastics pipes require many raw materials and produces poisonous waste. Thin-wall iron pipes have poor corrosion resistance.

In recent years, bamboo fiber composite pipes and bamboo-sand composite pipes have been developed. However, bamboo fibers are relatively expensive, and bamboo-sand composite pipes are heavy, and consequently, difficult to transport and install.

SUMMARY OF THE INVENTION

In view of the above-described problems, it is one objective of the invention to provide a thermosetting bamboo-wood composite pipe that is energy-saving, environment-friendly, low-weight, and inexpensive.

To achieve the above objective, in accordance with one embodiment of the invention, there is provided a thermosetting bamboo-wood composite pipe comprising: an inner liner layer, a reinforcement layer, a structural layer, and an outer protection layer. The reinforcement layer formed by wound bamboo strips and the structural layer formed by wound planed veneer or two-ply board are respectively disposed between the inner liner layer and the outer protection layer from the inside out. The composite pipe of the invention adopts multi-layer composite structure, the reinforcement layer adopts environment-friendly and renewable bamboo. As a regenerative and environment-friendly resource, the bamboo possesses light weight, high strength, anticorrosion, and low price. The structural layer is made of fast-growing trees characterized by short growing period, simple processing, light weight, corrosion resistance and low price, thus further decreasing the production cost.

The bamboo strips of the reinforcement layer are regularly-wound and adhere to the outer surface of the inner liner layer. The planed wooden board of the structural layer is a veneer or two-ply board uniformly distributed on an outer surface of the reinforcement layer. When winding the bamboo strips of the reinforcement layer and the structural layer, a certain amount of an amino resin is simultaneously added, and the thickness of each layer is in accordance with the use requirement to enable the pipe to reach a designed strength. Through the structural layer, the two-ply board are attached to the outer surface of the reinforcement layer, the positive and reverse sides of the wooden board are coated with amino resin, and the thickness of the structural layer is designed according to different use requirement.

The bamboo strips of the reinforcement layer have a length of between 0.5 and 2 m, a width of between 5 and 10 mm, and a thickness of between 0.3 and 1 mm. The bamboo strips of such size have low processing difficulty, high utilization, reduced production cost, and sufficient adhering strength in thermal expansion and cold contraction conditions.

In the reinforcement layer, the bamboo strips are first radially wound to form a radial layer to adhere to the outer surface of the inner liner layer. The bamboo strips are then axially wound to form an axial layer to adhere to an outer surface of the radial layer. The winding of the bamboo strips in the radial direction and subsequent in the axial direction is able to optimize the loading performance of the pipe.

The planed board in the structural layer is a veneer or two-ply board having a thickness of 0.1-2 mm, a width of 5-300 mm. The planed veneer is a continuous wooden veneer obtained by rotary cutting, and to improve the tensile strength, two or more sewing threads can be longitudinally disposed on the veneer; the planed two-ply board is formed by bonding different thickness of veneers, and the wood grain of the planed two-ply board is cross bonded. The planed veneer or two-ply board plays a role in increasing pipe stiffness, thus preventing the pipe from deforming.

The inner liner layer is formed by adhering a nonwoven fabric to a needled bamboo mat by an adhesive, and a thickness of the inner liner layer is between 0.5 mm and 1.5 mm. The nonwoven fabric can be bamboo fiber, linen, chemical fiber, glass fiber, or the like, and the inner liner layer has advantages of antiosmosis, anticorrosion, cleanness, and smooth inner wall.

The outer protection layer is coated on an outer surface of the structural layer, and a thickness of the outer protection layer is between 0.5 and 1.5 mm. The outer protection layer adopts anticorrosive and waterproof materials.

The inner liner layer, the reinforcement layer, and the structural layer adhere to one another and are then cured to form an integrated body. Thus, the product reaches the designed strength and rigidity, which is convenient for package, storage, and transportation.

Compared with the prior art, the thermosetting bamboo-wood composite pipe in accordance with embodiments of the invention has the following advantages: the invention employs planed boards to produce the thermosetting bamboo-wood composite pipe, thus reducing the material costs of the composite pipe, improving the production efficiency, and supplying high quality and cheap pipes for agricultural irrigation, water drainage, building ventilation, etc. In the meanwhile, the pipe of the invention adopts fast-growing trees as material, thus increasing the rigidity of the pipe, recuing the weight thereof, which is favorable to the transportation of the pipe.

BRIEF DESCRIPTION OF THE DRAWINGS

The invention is described hereinbelow with reference to accompanying drawings, in which the sole figure is a structure diagram of a thermosetting bamboo-wood composite pipe according to one embodiment of the invention.

DETAILED DESCRIPTION OF THE EMBODIMENTS

For further illustrating the invention, experiments detailing a thermosetting bamboo-wood composite pipe are described hereinbelow combined with the drawings. It should be noted that the following examples are intended to describe and not to limit the invention.

EXAMPLE 1

A thermosetting bamboo-wood composite pipe DN600 is mainly used in technical fields of main pipes in agricultural irrigation, sub-main pipes for sewage gathering pipelines, circulating cooling water, building ventilation, and the like. As shown in FIG. 1, the composite pipe of the invention comprises: an inner liner layer 1, a reinforcement layer 2, a structural layer 3, and an outer protection layer 4. The inner liner layer 1, the reinforcement layer 2, and the structural layer 3 are layer-by-layer bonded and cured to form an integrated composite body. The outer protection layer 4 is coated on the outer surface of the structural layer 3. Specific working process is as follows:

1. Fresh bamboo is processed into bamboo strips having a length of between 0.5 and 2 m, a width of between 5 and 10 mm, and a thickness of between 0.3 and 1 mm.

2. A release film is coated on a polished straight pipe module made of a steel or a glass steel having an outer diameter of 600 mm, and then the inner liner layer 1 having the thickness of between 0.5 and 1.5 mm is manufactured on the straight pipe module by using a resin having excellent anticorrosion performance, a bamboo fiber nonwoven fabric, and a needled bamboo mat.

3. After the inner liner layer 1 is cured, the bamboo strips are loaded on a winding machine and then regularly laid on the inner liner layer 1 on the straight pipe module by mechanical winding, during which an amino resin is added according to a certain formulation to form the reinforcement layer 2. The winding of the reinforcement layer 2 is conducted as follows: the bamboo strips are first radially wound to form a radial layer to adhere to the outer surface of the inner liner layer; and the bamboo strips are then axially wound to form an axial layer to adhere to an outer surface of the radial layer. A thickness of the whole reinforcement layer 2 is 4 mm.

4. Outside the reinforcement layer 2, the planed veneer with a thickness of 0.1-2 mm is processed to have a width of 50-300 mm, and then dipped into a dip tank, so that the periphery of the planed veneer is stained with amino resin. The planed veneer is repeatedly bonded on the surface of the reinforcement layer until a desired thickness is reached, thus forming the structural layer 3. The planed veneer is a continuous wooden veneer obtained by rotary cutting.

5. After the winding, the pipe is heated and cured to crosslink and cure the resin so as to form the integrated thermosetting bamboo-wood composite pipe.

6. A layer of waterproof and anticorrosive resin with anti-radioactive filler is coated outside the pipe so as to form the outer protection layer 4 having a thickness of between 0.5 and 1 mm.

The pipe is performed with hydraulic testing, from which it is indicated that a short-time failure pressure reaches 0.6 megapascal, a rigidity reaches 5000 N/m², and a material density of the pipe is between 1.0 and 1.1.

EXAMPLE 2

A thermosetting bamboo-wood composite pipe DN300 is mainly used in technical fields of main pipes in agricultural irrigation, upstream branch pipes for sewage gathering pipelines, circulating cooling water, and the like. As shown in FIG. 1, the composite pipe of the invention comprises: an inner liner layer 1, a reinforcement layer 2, a structural layer 3, and an outer protection layer 4. The inner liner layer 1, the reinforcement layer 2, and the structural layer 3 are layer-by-layer bonded and cured to form an integrated composite body. The outer protection layer 4 is coated on the outer surface of the structural layer 3. Specific working process is as follows:

1. Fresh bamboo is processed into bamboo strips having a length of between 0.5 and 2 m, a width of between 5 and 10 mm, and a thickness of between 0.3 and 1 mm.

2. A release film is coated on a polished straight pipe module made of a steel or a glass steel having an outer diameter of 300 mm, and then the inner liner layer 1 having the thickness of between 1.2 and 2.5 mm is manufactured on the straight pipe module by using a resin having excellent anticorrosion performance, a bamboo fiber nonwoven fabric, and a needled bamboo mat.

3. After the inner liner layer 1 is cured, the bamboo strips are loaded on a winding machine and then regularly laid on the inner liner layer 1 on the straight pipe module by mechanical winding, during which an amino resin is added according to a certain formulation to form the reinforcement layer 2. The winding of the reinforcement layer 2 is conducted as follows: the bamboo strips are first radially wound to form a radial layer to adhere to the outer surface of the inner liner layer; and the bamboo strips are then axially wound to form an axial layer to adhere to an outer surface of the radial layer. A thickness of the whole reinforcement layer 2 is 4 mm.

4. Outside the reinforcement layer 2, the planed two-ply board with a thickness of 0.1-2 mm is processed to have a width of 50-300 mm, and then dipped into a dip tank, so that the periphery of the planed veneer is stained with amino resin. The planed veneer is repeatedly bonded on the surface of the reinforcement layer until a desired thickness is reached, thus forming the structural layer 3. The planed two-ply board is formed by bonding different thickness of veneers, and the wood grain of the planed two-ply board is cross bonded.

5. After the winding, the pipe is heated and cured to crosslink and cure the resin so as to form the integrated thermosetting bamboo-wood composite pipe.

6. A layer of waterproof and anticorrosive resin with anti-radioactive filler is coated outside the pipe so as to form the outer protection layer 4 having a thickness of between 0.5 and 1 mm.

The pipe is performed with hydraulic testing, from which it is indicated that a short-time failure pressure reaches 1.0 megapascal, and a rigidity reaches 10000 N/m².

The above description in the specification is only an illustration of the structure of the pipe. The width of the planed board in the structural layer 3 can be narrower, for example, to be 5-300 mm. The thickness of the outer protection layer can be adjusted to be 0.5-1.5 mm according to the external environment in actual use. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A composite pipe, comprising
an inner liner layer;
a reinforcement layer;
a structural layer; and
an outer protection layer;
wherein
the inner liner layer, the reinforcement layer, the structural layer, and the outer protection layer are arranged in that order along a radial direction of the pipe from the inside out;
the reinforcement layer comprises wound bamboo strips;
the structural layer comprises a wound wood planed board; and
the reinforcement layer and the structural layer are sandwiched between the inner liner layer and the outer protection layer.

2. The pipe of claim 1, wherein
the bamboo strips of the reinforcement layer are regularly-wound and adhere to an outer surface of the inner liner layer;
the planed board of the structural layer is a veneer or two-ply board; and
the planed board is regularly arranged on an outer surface of the reinforcement layer.

3. The pipe of claim 1, wherein the bamboo strips of the reinforcement layer have a length of between 0.5 and 2 m, a width of between 5 and 10 mm, and a thickness of between 0.3 and 1 mm.

4. The pipe of claim 2, wherein the bamboo strips of the reinforcement layer have a length of between 0.5 and 2 m, a width of between 5 and 10 mm, and a thickness of between 0.3 and 1 mm.

5. The pipe of claim 1, wherein during manufacture of the reinforcement layer, the bamboo strips are first radially wound to form a radial layer to adhere to the outer surface of the inner liner layer; and then the bamboo strips are axially wound to form an axial layer to adhere to an outer surface of the radial layer.

6. The pipe of claim 2, wherein during manufacture of the reinforcement layer, the bamboo strips are first radially wound to form a radial layer to adhere to the outer surface of the inner liner layer; and then the bamboo strips are axially wound to form an axial layer to adhere to an outer surface of the radial layer.

7. The pipe of claim 1, wherein the planed board in the structural layer is a planed veneer or two-ply board having a thickness of 0.1-2 mm, a width of 5-300 mm.

8. The pipe of claim 2, wherein the planed board in the structural layer is a planed veneer or two-ply board having a thickness of 0.1-2 mm, a width of 5-300 mm.

9. The pipe of claim 7, wherein the planed veneer is a continuous wooden veneer obtained by rotary cutting; the two-ply board is formed by bonding different thickness of veneers, and wood grains of the two-ply board are cross bonded.

10. The pipe of claim 8, wherein the planed veneer is a continuous wooden veneer obtained by rotary cutting; the two-ply board is formed by bonding different thickness of veneers, and wood grains of the two-ply board are cross bonded.

11. The pipe of claim 1, wherein the inner liner layer is formed by adhering a nonwoven fabric and a needled bamboo mat, and a thickness of the inner liner layer is between 0.5 mm and 1.5 mm.

12. The pipe of claim 1, wherein the outer protection layer is coated on an outer surface of the structural layer, and a thickness of the outer protection layer is between 0.5 and 1.5 mm.

13. The pipe of claim 1, wherein the inner liner layer, the reinforcement layer, and the structural layer adhere to one another and form an integrated body.

* * * * *